(12) United States Patent
Gitis et al.

(10) Patent No.: US 6,257,953 B1
(45) Date of Patent: Jul. 10, 2001

(54) METHOD AND APPARATUS FOR CONTROLLED POLISHING

(75) Inventors: Norm Gitis, Cupertino; Michael Vinogradov, Sunnyvale, both of CA (US)

(73) Assignee: Center for Tribology, Inc., Campbell, CA (US)

(*) Notice: Subject to any disclaimer, the term of this patent is extended or adjusted under 35 U.S.C. 154(b) by 0 days.

(21) Appl. No.: 09/669,214

(22) Filed: Sep. 25, 2000

(51) Int. Cl.[7] .................................................. B24B 49/00
(52) U.S. Cl. ......................................... 451/5; 451/8; 451/287
(58) Field of Search .................................. 451/5, 6, 41, 8, 451/285, 286, 287, 288, 398

(56) References Cited

U.S. PATENT DOCUMENTS

| | | |
|---|---|---|
| 5,222,329 | 6/1993 | Yu . |
| 5,242,524 | 9/1993 | Leach et al. . |
| 5,308,438 | 5/1994 | Cote et al. . |
| 5,337,015 | 8/1994 | Lustig et al. . |
| 5,413,941 | 5/1995 | Koos et al. . |
| 5,439,551 | 8/1995 | Meikle et al. . |
| 5,738,562 | 4/1998 | Doan et al. . |
| 5,830,041 | 11/1998 | Takahashi et al. . |
| 5,876,265 | 3/1999 | Kojima . |
| 5,904,608 * | 5/1999 | Watanabe ................................ 451/5 |
| 5,944,580 * | 8/1999 | Kim et al. ................................ 451/9 |
| 5,948,700 | 9/1999 | Zheng et al. . |
| 6,007,405 * | 12/1999 | Mei ........................................ 451/5 |
| 6,010,538 * | 1/2000 | Sun et al. .............................. 756/345 |
| 6,015,754 | 1/2000 | Mase et al. . |

* cited by examiner

Primary Examiner—Timothy V. Eley
Assistant Examiner—Dung Van Nguyen
(74) Attorney, Agent, or Firm—Ilya Zborovsky (57) ABSTRACT

An apparatus for controlling a polishing process, in particular for detecting an end point of the polishing process, comprising a rotating platen with a pad, a rotating head that supports an object to be treated, e.g., a semiconductor wafer, and performs radial movements with respect to the platen, and an end-point control system comprising a plurality of groups of various sensing devices for detecting an end point of the process. In the illustrated embodiment one group of the sensing devices is a group of electrical-conductive elements located on the surface of the pad and connected via contact pins embedded in the material of the platen to respective resistance measurement unit. A second group of sensing elements is represented by capacitance probes having conductive elements on the surface of the pad and connected via contacts embedded in the body of the platen to the capacitance measurement unit. A third group of sensing devices is represented by acoustic emission sensors built on various levels into components of the rotating head. A fourth group of sensing devices is represented by a pair of force/torque sensors connected with drive shafts of the rotating head and the platen, respectively, and intended for direct measurement of torques of respective shafts and a coefficient of friction between the wafer and the polishing pad. All groups of sensors work simultaneously and their measurement data is processed and analyzed by a control unit for obtaining accurate and reliable results.

21 Claims, 4 Drawing Sheets

METHOD AND APPARATUS FOR CONTROLLED POLISHING

FIELD OF THE INVENTION

The present invention relates to field of surface treatment, in particular, to processes of polishing and planarization of surfaces. The invention may find use in the processing of semiconductor wafers at various stages of the manufacturing of semiconductor chips.

BACKGROUND OF THE INVENTION

Polishing is a technological process, which is widely used in semiconductor industry for manufacturing, e.g., semiconductor wafers with surfaces of high planarity.

Planarized surfaces are highly desirable on shallow trench isolation layers, inter-layer dielectrics, inter-metal dielectrics, and other layers used in modem microelectronics. The polishing planarization process is important since, in order to fabricate the next level circuit, high-resolution lithographic processes must be utilized. The accuracy of a high-resolution lithographic process can only be obtained when the process is carried out on a substantially flat surface. The planarization process is therefore a crucial processing step in the fabrication of a semiconductor device.

A planarization process can be carried out by chemical-mechanical polishing, or CMP. The process has been widely used in fabricating semiconductor devices of various types, primarily for polishing the front or device surface of a semiconductor wafer for achieving planarization and for preparation for the next level processing. A wafer is frequently planarized one or more times during a fabrication process in order for the top surface of the wafer to be as flat as possible.

A CMP process can be performed, e.g. by using a rotating polishing platen with a polishing pad in combination with a pneumatically actuated rotating head, holding the wafer.

A wafer can be polished in a CMP apparatus by being placed on a carrier, assembled on the rotating head, and pressed down, under controlled pressures, onto a polishing pad, which is attached on the platen and covered with a polishing slurry, e.g. of colloidal silica or alumina. A polishing pad used on a rotating platen is typically constructed of two layers overlying a platen with a resilient (elastic) layer as an outer layer of the pad. The layers are typically made of polymeric materials. A polishing pad may be made larger than a wafer while the wafer is kept off-center on the pad in order to prevent polishing a non-planar surface on the wafer. The pad may have an orbital rotation. The wafer itself is also rotated during the polishing process to prevent polishing a tapered profile on the wafer surface. The axes of rotation of the wafer and pad are deliberately not collinear, though parallel. It is known that uniformity in wafer polishing by a CMP process is a function of pressure, velocity, and concentration of the slurry.

Both the CMP and traditional mechanical abrasion polishing processes have a difficulty of their process control. In particular, end point detection, or exact determination of a moment at which the polishing process has to be stopped, has been a problem for the industry. The CMP process is frequently carried out without a clear signal about when the process is completed, just by using only empirical polishing rates and timed polish instead. Since the calculation of required polish time based on empirical polishing rates is frequently inaccurate, the empirical method fails frequently, resulting in serious yield drops and waste of the expensive wafers with devices.

Therefore, process control and end point detection are the important issues for automation of the aforementioned processes.

Known in the art are end point detection methods utilizing optical, acoustical, electrical, and mechanical measurements.

Optical methods of end point detection in polishing are based on surface reflectivity, light transmission, and interferometry measurements, e.g., by means of a laser beam. An example of such method is described by Koos et.al., in U.S. Pat. No. 5,413,941. Here the wafer being polished is faced against a mirror as it comes off-platen. Laser light is passed transversely between the wafer surface and the mirror, causing multiple reflections between mirror and wafer. A detector at the opposite side records the linear intensity signature of the wafer surface from the exit beam. This signal is a direct measure of the degree of surface planarity and as such provides a monitor of the planarization process.

Optical methods, however, may not be applicable to chemical mechanical polishing in some cases, since the CMP can involve the use of nontransparent media such as polishing slurry. Therefore for CMP process control other methods of end point detection are required.

Examples of CMP process control method based on measurement of the running motor current in order to detect the variations of the motor torque, related to the variations of mechanical parameters in the zone of contact of the rotating pad with the surface being treated (such as friction coefficient), are described, e.g., in U.S. Pat. Nos. 5,948,706, 5,830,041, 5,308,436. Another method and apparatus (see, e.g., U.S. Pat. No. 5,738,562) for end-point detection during CMP has been developed based on the measurements of the variations of translational (lateral) motion of the polishing platen, related to the variations of the friction coefficient of different film materials. Both these methods are based on indirect measurement techniques, used for very approximate evaluation of the friction variations, cannot produce accurate measurements of the friction coefficient and thus, are not used for the practical CMP process control.

The CMP processes typically involve polishing of one external layer on the wafer surface till the next layer is exposed. Usually these layers comprise various combinations of materials, like metals, semiconductors and dielectrics. When these layers have different electrical characteristics, like electrical conductivity, dielectric constant, etc., the measurements of these characteristics may be used for end point detection.

For instance, one of these methods refers to the measurement of electrical resistance of a special test structure formed on the wafer surface (e.g., U.S. Pat. No. 6,015,754). Implementation of this method requires electrical contacts to be provided to the wafer surface at certain locations and a special test pattern to be created on the surface before processing, which complicates the process and is impractical.

Another method and apparatus is based on the measurements of electrical resistance of the wafer structure. It includes a pair of electrical contacts that connect the surface of a material being polished to the measurement circuitry, said contacts present two openings in the polishing pad filled with a conductive material such as conductive epoxy (e.g., U.S. Pat. No. 5,242,524).

Similarly, in yet another method and apparatus for end-point detection during CMP of a dielectric layer, which uses the measurements of electrical capacitance of the wafer structure, a pair of electrodes, central and a surrounding guard electrode, forms a thickness detection region, that is, a capacitance probe. Said electrodes embedded within and electrically isolated from the polishing table and electrically contacting the wafer surface via openings in the polishing pad filled with a conductive material or conductive slurry (e.g., U.S. Pat. No. 5,337,015).

Another group of methods and apparatus for end-point detection during CMP is based on the measurements of sound waves or acoustic noise, generated in the interface between the wafer and polishing material, and detected with a microphone (e.g., U.S. Pat. Nos. 5,439,551, 5,222,329).

All these methods and apparatuses are based on the fact that when one layer is removed and the next layer is exposed by CMP, this transition is characterized by noticeable changes in the amplitude and spectrum of an acoustic signal. The acoustic signals are detected with the use of an acoustic signal receiver (such as a microphone) located in the vicinity, but outside of the polishing zone of a wafer-pad contact. The signal is then recorded in a manner known in the art and used for a process analysis.

It is understood that in CMP the main source of acoustic signal, which contains valuable information, is a zone of direct contact of the polishing pad with an object being polished such a semiconductor wafer. When the acoustic receiver is located outside the contact zone and separated from the signal source by an air gap, the recorded acoustic signal has a low level and contains a lot of environmental noise. The recorded signal may be especially noisy, when there is no signal filtering done to filter out the noise. Therefore a signal-to-noise ratio is very low, which reduces the accuracy of process control.

Yet another method and apparatus for end-point detection during CMP are based on the measurements and analysis of low-frequency vibrations (typically, less than 50 kHz), caused by interactions of the polishing pad and semiconductor wafer in the course of polishing (e.g., U.S. Pat. No. 5,876,265).

Both methods, acoustical and vibrational, use relatively low-frequency measurements in a bandwidth of just several kilohertz, and thus do not provide high accuracy and resolution in micro-scale process detection required for thin-film polishing and planarization. Also, there is significant influence of environmental noise and vibrations having similar bandwidth.

Thus, in addition to disadvantages mentioned above, each existing mechanical, acoustical, and electrical method for controlling CMP processes is applicable to certain specific conditions of treatment and has a limited application, if any, under other conditions. Another disadvantage of all existing methods is lack of uniformity of CMP control. Moreover, when the CMP is used for planarization within the same layer on the wafer, none of the known methods of polishing process control provides reasonable effectiveness and reliability.

OBJECTS OF THE INVENTION

It is an object of the present invention to provide effective, universal, accurate, and reliable method and apparatus for controlling CMP processes. Another object is to provide a method and apparatus, which control CMP processes on the basis of combined direct mechanical, electrical, and acoustical measurements of polishing conditions. Still another object is to provide method and apparatus which equally applicable for controlling CMP in treating both layered and uniform materials of various types.

SUMMARY OF THE INVENTION

An apparatus for controlling a polishing process, in particular for detecting an end point of the polishing process, comprising a rotating platen with a pad, a rotating head that supports an object to be treated, e.g., a semiconductor wafer, and performs radial movements with respect to the platen, and a process control system comprising a plurality of groups of various sensing devices for detecting changes of the process parameters. In the illustrated embodiment one group of the sensing devices is a group of conductive elements formed in the pad and connected via contacts embedded in the body of the platen to respective resistance measurement unit. A second group of sensing devices is represented by capacitance probes comprising conductive elements in the pad and connected via contacts embedded in the body of the platen to the capacitance measurement unit. A third group of sensing devices is represented by acoustic emission sensors built on various levels into components of the rotating head. A fourth group of sensing devices is represented by a pair of torque/force sensors connected with drive shafts of the rotating head and the platen, respectively, and intended for direct measurement of torque of respective shaft and a coefficient of friction between the wafer and the polishing pad. All groups of sensors work simultaneously and their measurement data are processed and analyzed by a data acquisition, processing and control units for obtaining accurate and reliable results.

DETAILED DESCRIPTION OF THE INVENTION

The inventors have developed a novel method and apparatus for controlling a polishing process, including efficient and accurate end point detection. The invention is based on the principle of detecting changes of multiple physical characteristics of surfaces and surface interaction in the zone of treatment by utilizing combined mechanical, electrical, and acoustical measurements. The results of these specific measurements are then compared and analyzed for use in controlling the polishing process, in particular, the end point detection of CMP.

Figure 1:
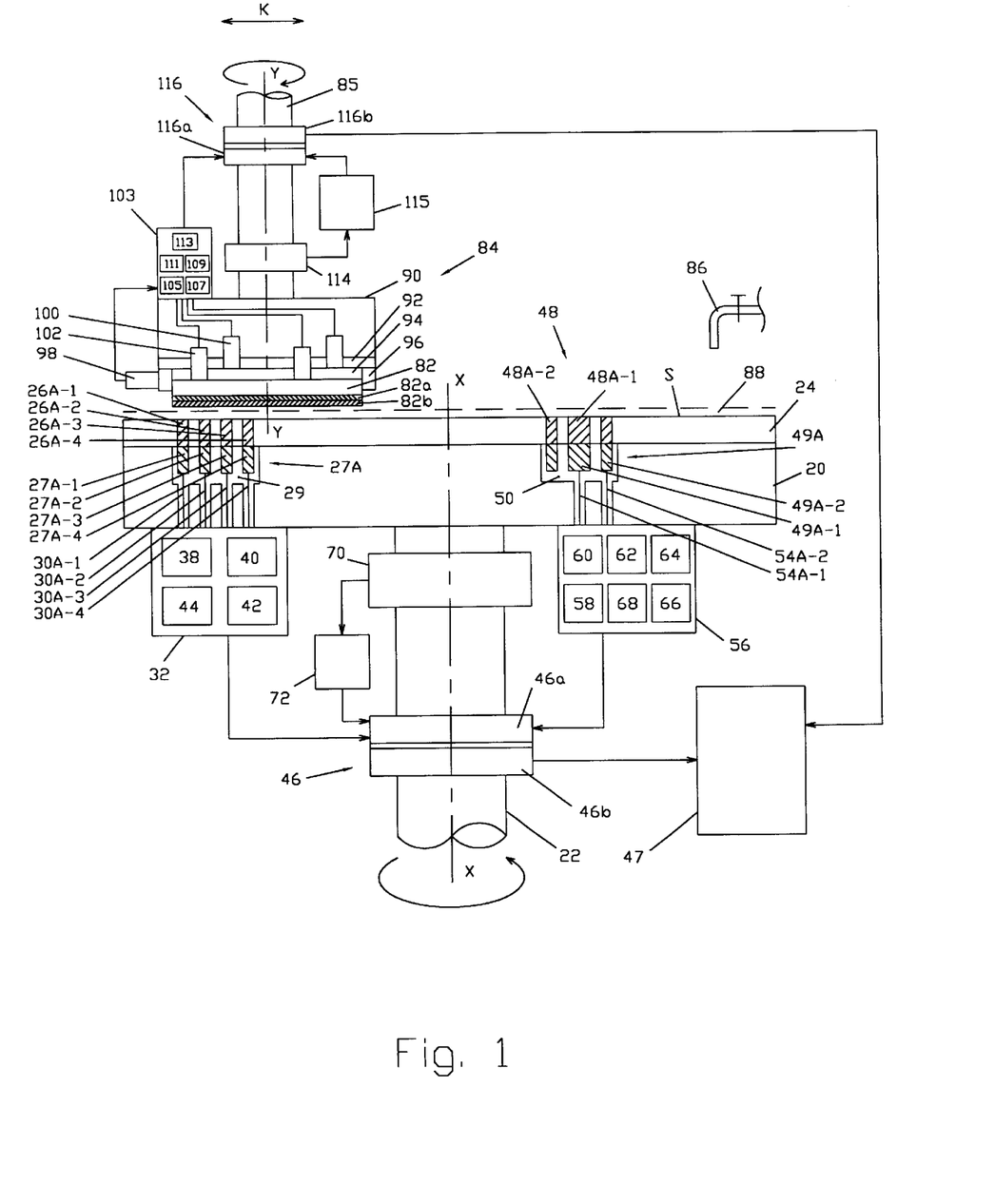
FIG. 1 is a schematic vertical partially sectional view of the apparatus of the invention.

As shown in FIG. 1, which is a schematic vertical partially sectional view, the apparatus of the invention has a platen 20 driven into rotation by means of a motor with transmission (not shown) on a shaft 22 around the axis X—X. The platen 20 supports a plastic polishing pad 24 made, e.g., from a nonconductive elastic polymer. The pad 24 is a consumable part, which may be worn-out during processing and is replaceable.

Figure 2:
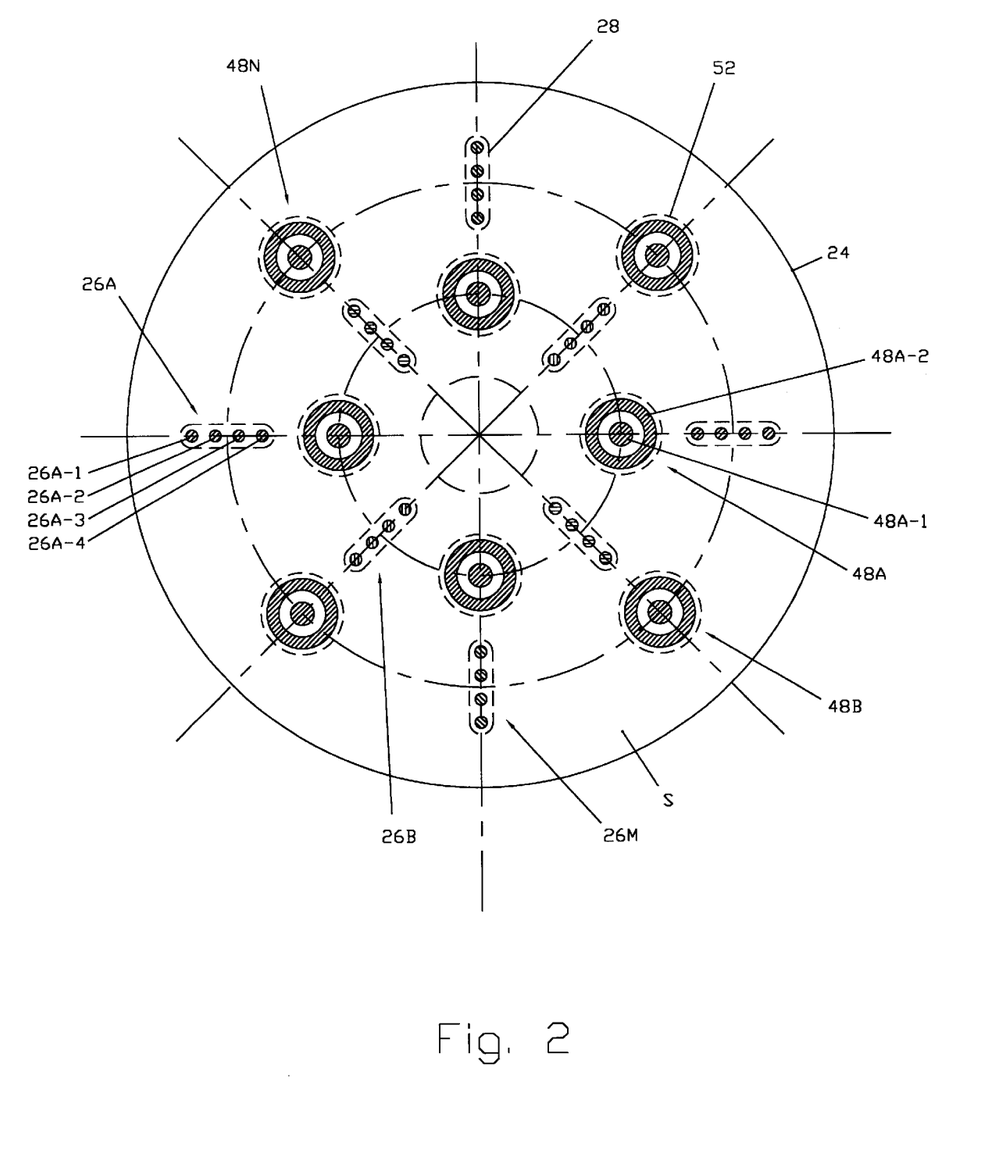
FIG. 2 is a plan view of the platen with the pad.

As shown in FIG. 1 and FIG. 2, which is a plan view of the platen 20 with the pad 24, the latter contains a plurality of groups, e.g., M groups, of conductive pins 26A, 26B, . .

. 26M, embedded into the body of the pad and exposed to its working surface S, and electric contacts 27A, 27B, ... 27M (described below) in the body of the platen. In the illustrated example, each group 26 of pins consists of four conductive pins. More specifically, a group 26A has conductive pins 26A-1, 26A-2, 26A-3, and 26A-4. A group 26B has conductive pins 26B-1, 26B-2, 26B-3, 26B-4 ... A group 26M has conductive pins 26M-1, 26M-2, 26M-3, 26M-4. These conductive pins can be formed, e.g., by forming through holes in the pad 24 and filling these holes with a conductive elastomer, so that the pins, which are exposed to the upper and lower surfaces of the pad 24, can be deformed together with the resilient pad 24. The groups of pins are circumferentially equally spaced from each other on circles which are concentric with respect to the shaft 22. Two such concentric circles are shown in FIG. 2, though the number of circles may be less or more than two. The platen 20 has groups 27 of contacts 27A-1, 27A-2, 27A-3, 27A-4 (shown on FIG. 1 only for the group 27A), etc., which are continuations of the aforementioned conductive pins 26A-1, 26A-2, 26A-3, 26A-4, 26B-1, 26B-2, 26B-3, 26B-4,... 26M-1, 26M-2, 26M-3, 26M-4 of the pad 24 and therefore are arranged in the same pattern, so that replacement of the pad will not discontinue respective electric circuits. The groups of contacts 27A-1, 27A-2, 27A-3, 27A-4, ... 27M-1, 27M-2, 27M-3, 27M-4 together with conductive pins 26A-1, 26A-2, 26A-3, 26A-4, ... 26M-1, 26M-2, 26M-3, 26M-4 form corresponding electrical resistance probes 28A, ... 28M.

If the platen 20 is made of an electrically conductive material, such as metal, the aforementioned contacts are electrically isolated from the body of the platen 20 by an insulating material 29 (FIG. 1). The conductive pins 26A-1, 26A-2, 26A-3, 26A-4, ... 26M-1, 26M-2, 26M-3, 26M-4 are electrically connected via the contacts 27A-1, 27A-2, 27A-3, 27A-4, etc. and conductive wires, such as wires 30A-1, 30A-2, 30A-3, 30A-4, shown on FIG. 1 only for the group 26A of the conductive pins, to a resistance measurement unit 32 which is attached, e.g., to the bottom side of the platen 20 and rotates therewith.

The resistance measurement unit 32 contains an AC or DC current source 38, a voltage drop signal conditioner 40, and commutation circuitry 42 with a position detection device 44, that provides synchronous commutation of conductive pins 26A-1, 26A-2, 26A-3, 26A-4, 26B-1, 26B-2, 26B-3, 26B-4, ... 26M-1, 26M-2, 26M-3, 26M-4 to a connecting unit 46, which consists of a moveable part 46a that rotates together with the platen assembly and a stationary part 46b that is connected to a data processing and control system 47. This data processing and control system processes received data signals and sends control commands to the motion control units for both head and platen motors (not shown). During operation of the apparatus, each group of contacts is sequentially connected to the resistance measurement unit 32 so that the respective conductive pins 26A-1, 26A-4, 26B-1, 26B-4, ... 26M-1, 26M-4 are connected to the current source 38, whereas the remaining conductive pins 26A-2, 26A-3, 26B-2, 26B-3, ... 26M-2, 26M-3 are connected to inputs of the voltage drop signal conditioner 40.

The apparatus of the invention also has a plurality of groups, e.g., N groups, of conductive elements 48A, 48B, ... 48N (FIG. 2) such as 48A-1, 48A-2; 48B-1, 48B-2; ... 48N-1, 48N-2, embedded within the material of the pad 24 and made, e.g., from an electrically conductive elastomer. Similarly dimensioned and arranged groups of contacts 49A-1, 49A-2, etc., which are circuit continuations of the pad's conductive elements 48A-1, 48A-2; etc., are formed in the body of the platen 20 and are isolated therefrom by insulating material 50, if the platen 20 is made of an electrically conductive material. In the illustrated example, each group of conductive elements and contacts consists of two concentric conductive elements and contacts. These groups of conductive elements and contacts form a plurality of capacitance probes 52A, 52B, ... 52N and are also equally spaced in circumferential direction and are arranged on concentric circles. Two circular rows of paired conductive elements are shown in FIG. 2 for illustrative purposes. Each group of conductive elements 48A, 48B ... 48N consists of an outer or surrounding element, such as conductive elements 48A-2, 48B-2, ... 48N-2, and an inner conductive elements, such as 48A-1, 48B-1, ... 48N-1. Similarly, each group of contacts 49A, 49B ... 49N consists of an outer or surrounding contact, such as contacts 49A-2, 49B-2, ... 49N-2, and an inner contact, such as 49A-1, 49B-1, ... 49N-1. Each aforementioned capacitance probe 52A, 52B, ... 52N is electrically connected by respective conductive wires 54A-1, 54A-2, etc. (FIG. 1), to a capacitance measurement unit 56. The capacitance measurement unit 56 is attached to the platen 20 and contains, e.g., a high frequency low voltage signal generator 58, a voltage follower 60, an amplitude control circuitry 62, a current-to-voltage converter 64, an output signal conditioner 66, and a commutation circuitry 68 with a position detection device (not shown) for providing synchronous commutation of groups of conductive elements 48A-1, 48A-2, 48B-1, 48B-2, ... 48N-1, 48N-2 to the connecting unit 46. During rotation of the platen 20, each capacitance probe 52A, 52B ... 52N is sequentially connected to the capacitance measurement unit 56.

The apparatus of the invention further contains a sensing unit 70 (FIG. 1), which may comprise a torque sensor, a force sensor or a multi-axis force/torque sensor. An example of such a sensor is a force sensor disclosed in our pending U.S. Patent application Ser. No. 09/624,512 filed on Jul. 24, 2000. The sensing unit 70 is mounted under the platen 20, e.g., on the shaft 22 and measures a compression force applied to the shaft 22 from the side of the platen 20 and/or a rotational torque applied to the platen 20 from the side of the shaft 22. The sensing unit 70 is connected to a friction measurement unit 72, which is mounted, e.g., under the platen 20 and provides amplification and conditioning of a data signal from the sensing unit 70.

Output signals from the resistance measurement unit 32, capacitance measurement unit 56, and from the friction measurement unit 72 are supplied to the moveable part 46a of the aforementioned connecting unit 46. This unit also contains the stationary part 46b, which is connected to the data processing and control system 47. The electric connection between the moveable part 46a and the stationary part 46b can be realized via slip-ring contacts, sliding brush-type contacts, or a wireless data transmitting system (not shown).

In the embodiment of FIG. 1, a semiconductor wafer 82 to be polished is held on a rotating head 84 driven by a motor with transmission (not shown) on a shaft 85 around the axis Y—Y, which is parallel but not coaxial to the axis X—X. On its front surface facing the pad 24, the wafer 82 has layers of materials 82a, 82b with different electrical and mechanical properties. The outer layer 82b of the wafer has to be at least partially removed by polishing.

In addition to the rotary movement, the head 84 (with the wafer 82) performs radial movements with respect to the rotating platen 20 (with the pad 24) shown by the arrow K.

The apparatus also has a slurry dispensing system 86, which feeds a polishing slurry 88 to the surface of the polishing pad 24.

In the illustrated embodiment, the rotating head 84 has a housing 90 with a backing plate 92 and/or a wafer holder 94 supporting the wafer 82 from the backside. A retaining ring 96 prevents slippage of the wafer 82 from its place on the head 84 during processing.

The head 84 has several groups of high-frequency acoustic emission (AE) sensors, namely a group of P sensors 98-1, 98-2, . . . 98-P mounted on the retaining ring 96, a group of Q sensors 100-1, 100-2, . . . 100-Q mounted on the backing plate 92, and a group of R sensors 102-1, 102-2, . . . 102-R embedded into the wafer holder 94, respectively. The AE sensors 102-1, 102-2, . . . 102-R are mounted into the wafer holder 94 in such a way, that sensing surfaces of these sensors are leveled in flush with the lower surface of the wafer holder 94 and are to be kept in contact with the backside of the wafer 82 during the processing. The AE sensors can be distributed over the back surface of the supporting plates uniformly, or in any other arrangement pattern. The AE sensors may have a frequency response within the range from 100 kHz up to 10 MHz, preferably 0.5 MHz to 5 MHz, and are connected to an acoustic emission measurement unit 103, which may comprise a wide-band amplifier 105, high- or band-pass filter 107, peak detector 109, multiplexer 111, and a signal conditioner 113. The acoustic emission measurement unit 103 provides detection and amplification of AE signals within a selected frequency band and synchronizes commutation of the signals from multiple AE sensors to the device output.

The apparatus of the invention has another sensing unit 114, which may be in the form of a torque sensor, force sensor, or multi-axis force/torque sensor. An example of such a sensor is a force sensor disclosed in our pending U.S. Patent application Ser. No. 09/624,512 filed on Jul. 24, 2000. This sensing unit is mounted above the rotating head 84, e.g., on the shaft 85 and measures a compression force and/or a rotational torque applied to the rotating head 84 from the side of the shaft 85 and/or a tangential friction force applied to the shaft 85 from the side of the rotating head 84. The sensing unit 114 is connected to a friction measurement unit 115, which is mounted, e.g., above the rotating head 84 and provides amplification and conditioning of a data signal from the sensing unit 114.

Output signals from the acoustic emission measurement unit 103 and from the friction measurement unit 115 are supplied to a connecting unit 116, which consists of a moveable part 116a rotating with the head assembly, and a stationary part 116b connected to the data processing and control system 47. The connection unit 116 is used to transfer electrical signals between the acoustic emission measurement unit 103, the friction measurement unit 115, and the aforementioned data processing and control system 47. Electric connection between the rotating and stationary parts can be carried out via slip-ring contacts, sliding brush-type contacts, or a wireless data transmitting system (not shown).

OPERATION OF THE APPARATUS OF THE INVENTION

The apparatus of the invention shown in FIGS. 1 and 2 operates as follows.

During a CMP process, each group of conductive pins 26A-1, 26A-2, 26A-3, 26A-4; 26B-1, 26B-2, 26B-3, 26B-4; . . . 26M-1, 26M-2, 26M-3, 26M-4 of the resistance probes 28 passes under the wafer 82. As a result, the electrical current flows through the contacts 27A-1, 27A-4; 27B-1, 27B-4; . . . 27M-1, 27M-4 of the resistance probes 28A, 28B, 28M, which are connected to the current source 38, through the conductive pins 26A-1, 26A-4; 26B-1, 26B-4; . . . 26M-1, 26M-4 of respective group in the pad 24, and through the portion of the wafer surface between corresponding pins 26A-1, 26A-4; 26B-1, 26B-4; . . . 26M-1, 26M-4. The voltage drop is measured between the remaining conductive pins 26A-2, 26A-3, 26B-2, 26B-3, . . . 26M-2, 26M-3, which are connected to inputs of the voltage drop signal conditioner 40. This voltage drop is proportional to the surface resistance of the wafer 82. When the head passes over a specific group of conductive pins of the pad, e.g., the pins 26A-1, 26A-2, 26A-3, and 26A-4, the output voltage drop signal is supplied via the pins 26A-2, 26A-3 to the resistance measurement unit 32, which also contains the synchronization mean that allows to take the measurements only from the group of pins which are currently under the wafer 82.

Similarly, during the CMP process, each group of conductive elements, such as 48A-1, 48A-2; 48B-1, 48B-2; . . . 48N-1, 48N-2, passes under the wafer 82 and connects corresponding contacts of the capacitance probes 52A, 52B, . . . 52N to the wafer surface. As a result, high-frequency electrical current from the signal generator 58 passes through the contacts 49A-1, 49A-2, etc., through the conductive elements 48A-1, 48A-2 etc., and through the surface of the wafer. Then the current, which is proportional to the probe capacitance, passes trough the current-to voltage-converter 64 and the output signal conditioner 66 of the capacitance measurement unit 56. As has been mentioned above, the capacitance measurement unit 56 is equipped with synchronization means that allows taking measurements only from the group of conductive elements that currently passes under the wafer 82.

In addition to the measurements described above, in the course of the CMP process, the data processing and control system of the apparatus of the invention constantly measures and registers a loading compression force applied to the wafer 82 from the side of the rotating head 84 and the rotational torques applied to the shafts 22 and 85. These measurements are performed by the sensing units 70 and 114. At a given loading force and a radial position of the head, the aforementioned rotational torques are proportional to a friction coefficient (COF) between the wafer 82 and the polishing pad 24.

The AE sensors 98-1, 98-2, . . . 98-P, 100-1, 100-2, . . . 100-Q, 102-1, 102-2, . . . 102-R mounted on the retaining ring 96, on the backing plate 92, and in the wafer holder 94, respectively, detect mechanical waves generated in the interface between the wafer 82 and the pad 24 during the CMP process and caused by interaction of the wafer surface with the slurry particles on the pad surface. These waves propagate through the bodies of the wafer 82, the wafer holder 94, the backing plate 92, and the retaining ring 96. Since all the parts conducting these waves (wafer, holder, backing plate, retaining ring) are made of solid materials with good elastic properties, propagation losses of the acoustic signals received by AE sensors in the device of invention are much lower than the losses of signals received by microphones of known CMP control systems where the microphones are separated from the wafer by an air gap.

It is understood that both amplitude and frequency spectrum of an AE signal depend in large on the mechanical properties of interacting surfaces, and that any given combination of materials on the interacting surfaces produces a unique spectrum of acoustic signals. Therefore, monitoring the AE signals from the interface between the wafer and the pad within predetermined frequency band makes it possible to detect the transition from one layer to another on the wafer surface.

It is also understood that at any given velocity of interacting surfaces, the time of interaction between small features on these surfaces is proportional to the dimensions of these features, and that the smaller surface features have to be detected, the shorter response time of a detecting system is required. At a typical rotational speed of 60 rpm, which corresponds to linear speeds of the order of 1 m/s, and with modem semiconductor wafers having sub-micron surface features, the response time of a detecting system has to be within sub-microsecond range. Therefore in order to detect micro-processes in the wafer-pad interface during the CMP, AE sensors with high bandwidth of several megahertz have to be used.

Let us assume that the outer layer 82b is made of metal, the next layer 82a is made of dielectric, and that the material of the pad 24 has a lower coefficient of friction against the material of the outer layer 82b than against the material of the next layer 82a.

Figure 3A:
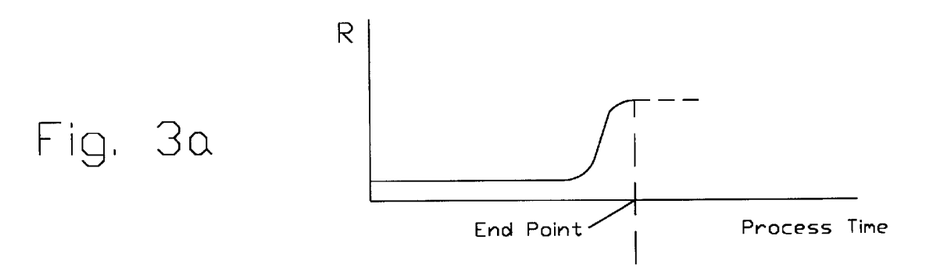
FIGS. 3A, 3B, 3C, and 3D are graphs illustrating changes in time for electrical resistance, capacitance, torque friction, and acoustic emission signals respectively, the changes being measured during polishing for the case of a semiconductor wafer with a conductive external layer and a dielectric next layer.

The CMP process is continued until the upper conductive layer is removed. When this layer is removed, the electrical resistance of the layered structure raises, and the corresponding voltage drop measured on the portion of the wafer surface between conductive pins 26A-2 and 26A-3 increases. The output signal from the resistance measurement unit 32 received by the data processing and control system 47 rises, which reflects the fact that the end point of CMP has been reached. This condition is shown in FIG. 3, where changes in time for electrical resistance is shown in FIG. 3A, for capacitance probes in FIG. 3B, for coefficient of friction and torque in FIG. 3C, and for AE in FIG. 3D.

Figure 3B:
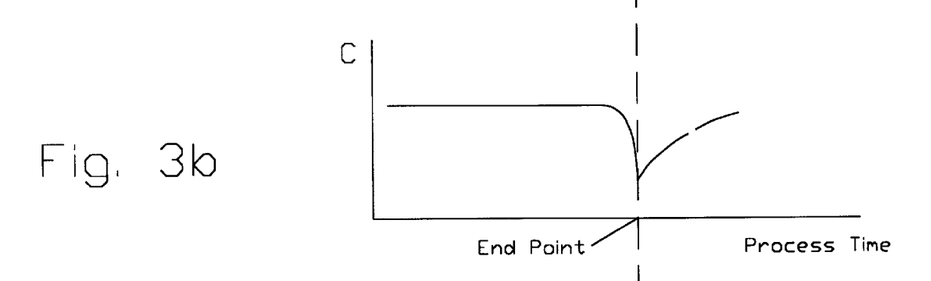

Simultaneously, a high-frequency electrical current from the signal generator and, respectively, an output signal of the capacitance measurement unit 56 drops from the high level, corresponding to full contact between conductive elements of the current capacitive probe through the metal layer 82b (short circuit), down to the low level, corresponding to thickness of the dielectric layer 82a, that also testifies to the fact that the end point of CMP has been reached (see FIG. 3B). Further continuation of the polishing process beyond this point would cause an increase in the output signal of the capacitance measurement unit 56, corresponding to the dielectric layer thickness reduction.

Figure 3C:
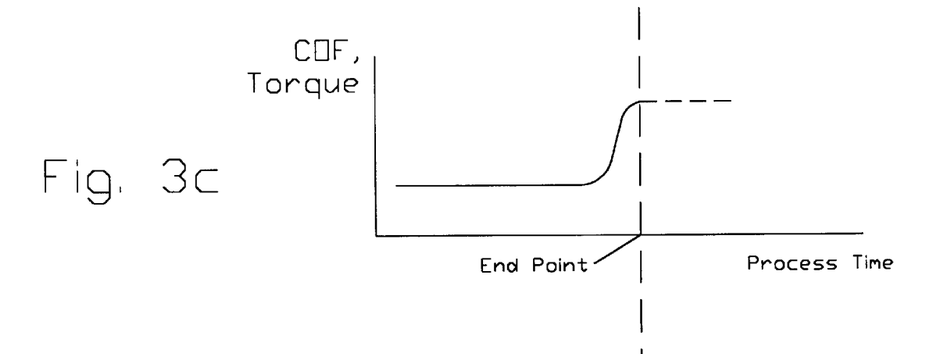

At the same time, the coefficient of friction between wafer and polishing pad and, respectively, output signals from the sensing unit 70 and the sensing unit 114, change from the low level, corresponding to the interactions between the pad 24 and the material of the layer 82b, to the high level, corresponding to the interactions between the pad 24 and the material of the layer 82a (see FIG. 3C).

Figure 3D:
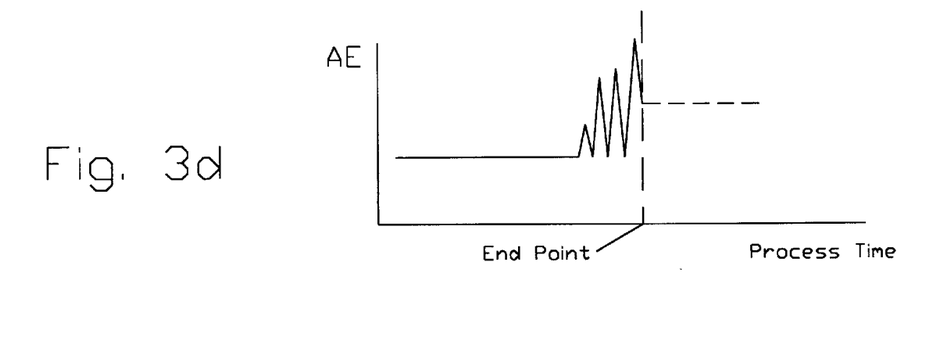

As described above, mechanical properties of interacting surfaces define the amplitude and frequency spectrum of the AE signal. Therefore, after removal of the upper layer 82b from the wafer, the output signal from the acoustic emission measurement unit 103 changes its level according to the change in the properties of the wafer surface layer 82a. This testifies to the fact that the end point in CMP is reached (see FIG. 3D). The final stage of polishing of the layer 82b can be characterized by irregular variations in the AE signal (e.g., in the form of peaks and jumps). This phenomenon can be used as a precursor of the end point in CMP process (FIG. 3D).

Since the AE sensors are used in a number of groups and in different parts of the head over the wafer, their signals can be used for evaluating uniformity of treatment.

Let us assume an opposite configuration, namely, when the outer layer 82b of the wafer is dielectric and next layer 82a is conductive. In this case the layered structure initially has a high surface resistance, which drops when the conductive layer starts to be exposed.

Figure 4A:
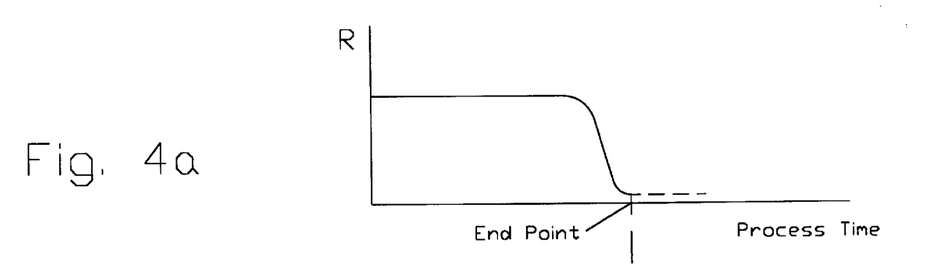
FIGS. 4A, 4B, 4C, and 4D are graphs illustrating changes in time for electrical resistance, capacitance, torque/friction, and acoustic emission signals respectively, the changes being measured during polishing for the case of a semiconductor wafer with a dielectric external layer and a conductive next layer.
Figure 4B:
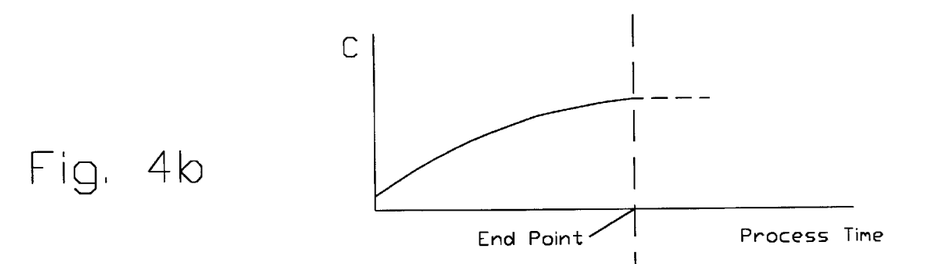
Figure 4C:
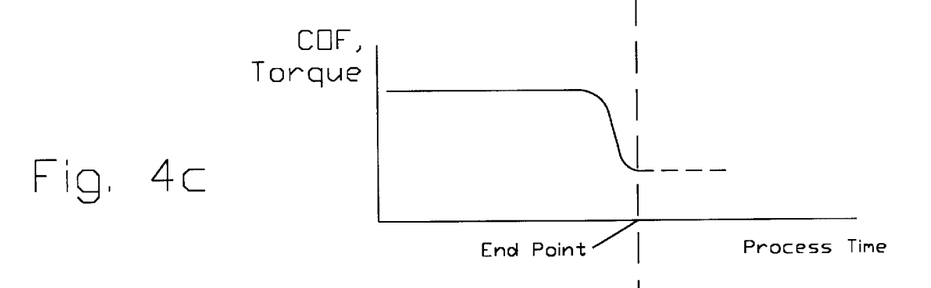
Figure 4D:
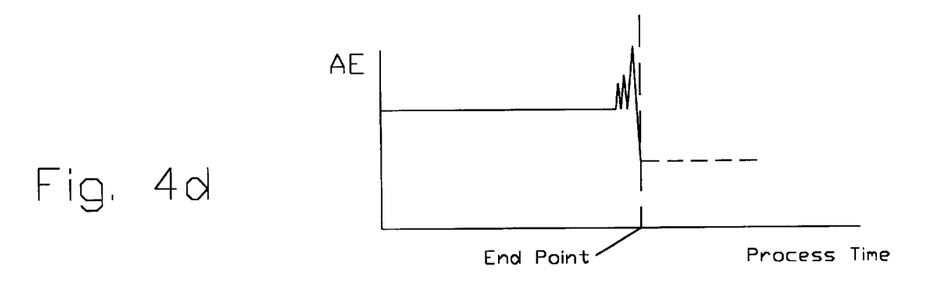

As a result, corresponding voltage drop measured on a portion of the wafer surface between conductive pins 26A-2 and 26A-3 decreases. The output signal from the resistance measurement unit 32 received by the data processing and control system 47 also changes from a high level in the beginning of the process to the low level (close to zero) indicating that the end point of CMP has been reached. This condition is shown in FIG. 4A. FIGS. 4B, 4C, and 4D show changes in time for electrical capacitance, torque and coefficient of friction, and an AE signal, respectively.

Simultaneously, a high-frequency electrical current from the signal generator and, respectively, an output signal of the capacitance measurement unit 56 increases, corresponding to the dielectric layer thickness reduction. In this case the current is inversely proportional to the thickness of the dielectric layer. When the dielectric layer 82b is completely removed, the conductive elements 48B-1 and 48B-2 come into contact with the metal layer 82a, so that the value of capacitance measured by the capacitance probes 52A, 52B, . . . 52N and the corresponding output signal of the capacitance measurement unit 56 jumps up.

This can also be used for the end point detection and control of CMP process (see FIG. 4B).

At the same time, the coefficient of friction between the wafer 82 and the polishing pad 24 and, respectively, the output signals from the sensing unit 70 and the sensing unit 114 change from the high level, corresponding to the interactions between the pad 24 and the material of the layer 82b, to the low level, corresponding to the interactions between the pad 24 and the material of the layer 82a (see FIG. 4C).

The changes in AE signal are similar to those described above. After removal of the upper layer 82b from the wafer 82, the output signal from the acoustic emission measurement unit 103 changes, in response to changes in surface properties of the wafer 82, from a high level to a low level, with possible irregularities preceding the transition to the next layer (see FIG. 4D).

Since conductive pins and elements of the pad 24 are used in a plurality of groups, continuous monitoring of the measurement data relating to resistance and capacitance provides high resolution in detecting the end point of the polishing process and allows for measurement with resolution of a fraction of one revolution of the pad 24. Arrangement of the resistance and capacitance probes on various radii of the polishing pad 24, makes it possible to evaluate radial uniformity of material removal from the surface of the wafer.

Measurement of coefficient of friction with the use of sensing units 70 and 114 produces integrated, average parameters of the CMP process over the entire contact area.

Thus it has been shown that the present invention provides effective, universal, accurate, and reliable method and apparatus for controlling polishing processes.

The apparatus of the invention controls polishing, e.g., CMP processes on the basis of combined direct mechanical, electrical, and acoustical measurements of polishing conditions. The method and apparatus are equally applicable for controlling CMP in treating both layered and uniform materials of various types.

Although the invention has been shown and described with reference to specific embodiments, it is understood that these embodiments were given only for illustrative purposes and that any changes and modifications in the design, forms, shapes, and materials are possible, provided these changes and modifications do not depart from the scope of the attached patent claims. For examples, the conductive elements and contacts may have a rectangular, triangular or any other cross sectional configuration. An object being treated is not necessarily a layered semiconductor wafer and may comprise a workpiece of a uniform material or the like. In this case changes of detectable properties on the surface being treated are caused by a decrease in microscopic unevenness or by a decrease in the thickness of the object. The conductive elements, contacts, and probes can be arranged on one or more than two circular rows. The rotating head may perform only a rotary motion, while the platen with the pad may perform rotation motions in combination with radial motions. In a multilayered structure of the object, the external layer can be non-conductive and the underlayer can be conductive and vise versa.

We claim:

1. An apparatus for controlled polishing, comprising:
    a rotating platen with a replaceable resilient pad removably attached to the top of said rotating platen, said replaceable pad having a working surface opposed to said rotating platen, said rotating platen having an axis of rotation;
    a rotating head having an axis of rotation and being capable of performing rotary motions and radial movements with respect to said platen, said axis of rotation of said rotating head being offset with respect to said axis of rotation of said platen, said rotating head having means for supporting an object to be treated, said object having a front surface to be polished and at least a portion with properties changed as a result of polishing;
    sensing means for combined sensing of changes that occur on said front surface of said object being polished during said polishing and for generating output data signals, said sensing means comprising:
        first mechanical sensing means associated with said rotating platen and generating first data signal;
        second mechanical sensing means associated with said rotating head and generating second data signal;
        a plurality of groups of acoustical sensing means built into said rotating head and generating third data signal;
        a plurality of groups of electrical sensing means built into said platen and said pad, generating fourth data signal and arranged circumferentially in at least one circular row concentrically with respect to said axis of rotation of said platen; and
    measuring means for acquiring, measuring and conditioning said data signals obtained from said sensing means, said measuring means having a first friction measurement unit, a second friction measurement unit, a resistance measurement unit, a capacitance measurement unit, and an acoustic measurement unit;
    control means for combined control of said polishing; and
    connecting means for connecting said measuring means to said control means, said connecting means comprising a first connecting unit and a second connecting unit.

2. The apparatus of claim 1, wherein said rotating platen has a drive shaft and said first mechanical sensing means comprising a first force/torque sensor installed on said drive shaft of said rotating platen, said rotating head has a drive shaft and said second mechanical sensing means comprises a second force/torque sensor installed on said drive shaft of said rotating head.

3. The apparatus of claim 2, wherein said plurality of groups of electrical sensing means comprises a first group and a second group, said first group being formed by a plurality of electric resistance measurement probes, and the second group is formed by a plurality of electric capacitance measurement probes.

4. The apparatus of claim 3, which has a source of electric current and wherein each of said electrical resistance measurement probes comprises at least a first pair of electrically-conductive elements, exposed to said working surface of said replaceable resilient pad, and electrically connectable to said source of electric current, and at least a second pair of electrically-conductive elements, exposed to said working surface of said replaceable, resilient pad, and electrically connectable to said resistance measurement unit.

5. The apparatus of claim 4, which has a source of an alternating electric current and wherein each of said electrical capacitance measurement probes comprises at least a first electrically-conductive element, exposed to said working surface of said replaceable resilient pad, and electrically connectable to said source of alternating electric current, and a second electrically-conductive element, exposed to said working surface of said replaceable resilient pad, and electrically connectable to said capacitance measurement unit.

6. The apparatus of claim 1, wherein said plurality of groups of electrical sensing means comprises a first group and a second group, said first group being formed by a plurality of electric resistance measurement probes, and the second group is formed by a plurality of electric capacitance measurement probes.

7. The apparatus of claim 6, which has a source of electric current and wherein each of said electrical resistance measurement probes comprises at least a first pair of electrically-conductive elements, exposed to said working surface of said replaceable resilient pad, and electrically connectable to said source of electric current, and at least a second pair of electrically-conductive elements, exposed to said working surface of said replaceable resilient pad, and electrically connectable to said resistance measurement unit.

8. The apparatus of claim 7, which has a source of an alternating electric current and wherein each of said electrical capacitance measurement probes comprises at least a first electrically-conductive element, exposed to said working surface of said replaceable resilient pad, and electrically connectable to said source of alternating electric current, and a second electrically-conductive element, exposed to said working surface of said replaceable resilient pad, and electrically connectable to said capacitance measurement unit.

9. The apparatus of claim 8, wherein each said electrically-conductive element of each said group comprise a resilient conductive pin embedded into said replaceable resilient pad and a contact element in said rotating platen.

10. The apparatus of claim 8, wherein said measuring means for acquiring, measuring and conditioning said data signals obtained from said sensing means comprise:
    a resistance measurement unit for acquiring, measuring and conditioning said data signals from said electric resistance measurement probes;
    a capacitance measurement unit for acquiring, measuring and conditioning said data signals from said electrical capacitance measurement probes;
    an acoustic measurement unit for acquiring, measuring and conditioning said data signals from said acoustical sensing means;
    a first friction measurement unit for acquiring, measuring and conditioning said data signals from said first mechanical sensing means; and a second friction measurement unit for acquiring, measuring and conditioning said data signals from said second mechanical sensing means.

11. The apparatus of claim 10, wherein:

said first connecting unit comprising a moveable part which rotates together with said rotating platen and a stationary part which is connected to said control means;

said resistance measurement unit comprises at least a first current source, a voltage drop signal conditioner, and a first commutation circuitry;

said resistance measurement unit being electrically connected to said moveable part of said first connecting unit;

said capacitance measurement unit comprises at least a second alternating current source, a current-to-voltage converter, an output signal conditioner, and a second commutation circuitry;

said capacitance measurement unit being electrically connected to said moveable part of said first connecting unit;

said first friction measurement unit being electrically connected to said moveable part of said first connecting unit;

said second connecting unit comprising a moveable part, which rotates together with said rotating head, and a stationary part which is connected to said control means;

said acoustic measurement unit comprises at least a wide-band amplifier, a band-pass filter, and a signal conditioner;

said acoustic measurement unit being electrically connected to said moveable part of said second connecting unit; and said second friction measurement unit being electrically connected to said moveable part of said second connecting unit.

12. The apparatus of claim 10, wherein said rotating head comprises a retaining ring, a backing plate, and an object holder, and said plurality of groups of said acoustic sensing means comprises groups of high-frequency acoustic emission sensors selected from a first group of high-frequency acoustic emission sensors, which are installed on said retaining ring, a second group of high-frequency acoustic emission sensors, which are mounted on said backing plate, and a third group of high-frequency acoustic emission sensors, which are embedded into said object holder.

13. The apparatus of claim 6, which has a source of an alternating electric current and wherein each of said electrical capacitance measurement probes comprises at least a first electrically-conductive element, exposed to said working surface of said replaceable resilient pad, and electrically connectable to said source of alternating electric current, and a second electrically-conductive element, exposed to said working surface of said replaceable resilient pad, and electrically connectable to said capacitance measurement unit.

14. The apparatus of claim 1, wherein said measuring means for acquiring, measuring and conditioning said data signals obtained from said sensing means comprise:

a resistance measurement unit for acquiring, measuring and conditioning said data signals from said electric resisistance measurement probes;

a capacitance measurement unit for acquiring, measuring and conditioning said data signals from said electrical capacitance measurement probes;

an acoustic measurement unit for acquiring, measuring and conditioning said data signals from said acoustical sensing means;

a first friction measurement unit for acquiring, measuring and conditioning said data signals from said first mechanical sensing means; and a second friction measurement unit for acquiring, measuring and conditioning said data signals from said second mechanical sensing means.

15. The apparatus of claim 14, wherein:

said first connecting unit comprising a moveable part which rotates together with said rotating platen and a stationary part which is connected to said control means;

said resistance measurement unit comprises at least a first current source, a voltage drop signal conditioner, and a first commutation circuitry;

said resistance measurement unit being electrically connected to said moveable part of said first connecting unit;

said capacitance measurement unit comprises at least a second alternating current source, a current-to-voltage converter, an output signal conditioner, and a second commutation circuitry;

said capacitance measurement unit being electrically connected to said moveable part of said first connecting unit;

said first friction measurement unit being electrically connected to said moveable part of said first connecting unit;

said second connecting unit comprising a moveable part, which rotates together with said rotating head, and a stationary part which is connected to said control means;

said acoustic measurement unit comprises at least a wide-band amplifier, a band-pass filter, and a signal conditioner;

said acoustic measurement unit being electrically connected to said moveable part of said second connecting unit; and said second friction measurement unit being electrically connected to said moveable part of said second connecting unit.

16. The apparatus of claim 14, wherein said rotating head comprises a retaining ring, a backing plate, and an object holder, and said plurality of groups of said acoustic sensing means comprises groups of high-frequency acoustic emission sensors selected from a first group of high-frequency acoustic emission sensors, which are installed on said retaining ring, a second group of high-frequency acoustic emission sensors, which are mounted on said backing plate, and a third group of high-frequency acoustic emission sensors, which are embedded into said object holder.

17. A method for controlling a process of polishing an object having a front surface to be polished, with at least a part of said object having properties which change during said process, said method comprising the steps of:

providing a polishing apparatus comprising a rotating platen having a drive shaft and replaceable resilient pad, a rotating head having a drive shaft and capable of performing rotary motions and radial movements with respect to said platen, said rotating head having means for supporting an object to be treated, said object having a front surface to be polished and at least a portion with properties changed as a result of polishing, and sensing means for combined sensing of changes that occur on said front surface of said object being polished during said process of polishing, said sensing means generating data signals and comprising a plurality of groups of mechanical sensing means, electrical resistance sensing means, electrical capacitance sensing means, acoustical sensing means, a measuring means, a control means, and a connecting means, said platen has an axis of rotation;

arranging at least one group of said mechanical sensing means in association with said drive shaft of said rotating platen;

arranging at least one group of said mechanical sensing means in association with said drive shaft of said rotating head;

arranging said groups of said electrical resistance sensing means and of said electrical capacitance sensing means circumferentially in at least one circular row concentrically with said axis of rotation of said platen;

arranging said acoustical sensing means in said rotating head;

polishing said object in said process of polishing by means of said apparatus;

sensing changes of said properties during said process of polishing simultaneously by means of said plurality of groups of electrical resistance sensing means, electrical capacitance sensing means, mechanical sensing means, and acoustical sensing means; and measuring and processing said data signals obtained from said plurality of groups of electrical resistance sensing means, electrical capacitance sensing means, mechanical sensing means, and acoustical sensing means by said measuring means; and controlling said process of polishing in response to said step of measuring and processing.

18. The method of claim 17, wherein said resilient pad is made of a non-conductive material, said object has a multilayered structure with a conductive external layer which is in contact with said pad and said electrical sensing means, and a non-conductive next layer, said controlling is detecting an end point of said process of polishing at which said conductive external layer is completely removed and said electrical sensing means come into contact with said next non-conductive layer.

19. The method of claim 18, wherein said mechanical sensing means are force/torque sensors for measuring change in a coefficient of friction in contact between said resilient pad and said object.

20. The method of claim 17, wherein said resilient pad is made of a non-conductive material, said object has a multilayered structure with a nonconductive external layer which is in contact with said pad add said electrical sensing means, and a conductive next layer, said controlling is detecting,an end point of said process of polishing at which said nonconductive external layer is completely removed and said electrical sensing means come into contact with said next conductive layer.

21. The method of claim 20, wherein said mechanical sensing means are force/torque sensors for measuring change in a coefficient of friction in contact between said resilient pad and said object.

* * * * *